United States Patent
Wang et al.

(10) Patent No.: US 10,399,409 B2
(45) Date of Patent: Sep. 3, 2019

(54) SYSTEM AND METHOD FOR REDUCING VOLATILE ORGANIC COMPOUNDS WITHIN A VEHICLE

(71) Applicant: GM Global Technology Operations LLC, Detroit, MI (US)

(72) Inventors: Wenshui Wang, Shanghai (CN); Yan Li, Pudong (CN); Xingli Jiang, Shanghai (CN); Xiaolin Zhu, Pudong (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 15/596,429

(22) Filed: May 16, 2017

(65) Prior Publication Data

US 2018/0334010 A1  Nov. 22, 2018

(51) Int. Cl.
*B60H 1/00* (2006.01)
(52) U.S. Cl.
CPC ......... *B60H 1/008* (2013.01); *B60H 1/00864* (2013.01); *B60H 1/00978* (2013.01)
(58) Field of Classification Search
None
See application file for complete search history.

(56) References Cited

U.S. PATENT DOCUMENTS

| | | | |
|---|---|---|---|
| 8,974,563 B2* | 3/2015 | Haseyama | F01N 3/0253 422/169 |
| 2004/0002349 A1* | 1/2004 | Yamagishi | H04W 88/02 455/456.3 |
| 2015/0032264 A1* | 1/2015 | Emmons | F24F 11/0001 700/276 |
| 2016/0015278 A1* | 1/2016 | Campo | G06K 9/0053 348/143 |
| 2017/0136848 A1* | 5/2017 | Trutnovsky | B60H 1/00864 |
| 2018/0222290 A1* | 8/2018 | Anderson | B60H 3/0633 |
| 2018/0319406 A1* | 11/2018 | Dudar | B60W 10/06 |

\* cited by examiner

*Primary Examiner* — Steven B McAllister
*Assistant Examiner* — Ko-Wei Lin

(57) ABSTRACT

Systems and methods according to the principles of the present disclosure include determining whether a volatile organic compound (VOC) characteristic within a cabin of a vehicle exceeds a predefined volatile organic compound threshold. Systems and methods can also include causing a blower of a Heating, Ventilation, and Cooling (HVAC) system of the vehicle to generate an airflow within the cabin for a predefined time period, an air distribution mode of operation to transition from a non-operational state to an operational state, cause an air intake mode of operation to transitions from a non-operational state to an operational state, or causing at least one window of the vehicle to transition from a closed position to an open position for the predefined time period when the volatile organic compound characteristic exceeds the predefined volatile organic compound threshold to reduce volatile organic compounds within the vehicle.

18 Claims, 7 Drawing Sheets

SYSTEM AND METHOD FOR REDUCING VOLATILE ORGANIC COMPOUNDS WITHIN A VEHICLE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to volatile organic compound (VOC) reduction operations within a vehicle, and more specifically to a system and a method for initiating a VOC reduction operation based upon one or more measured characteristics (i.e., VOC concentration characteristics, external environmental characteristics, etc.).

Typically, interior portions of a vehicle release VOCs. These interior portions can include interior trim components, such as seats, panels, and the like.

SUMMARY

A system according to the principles of the present disclosure includes a volatile organic compound comparison module and a volatile organic compound reduction control module. The volatile organic compound module can determine whether a volatile organic compound characteristic within a cabin of a vehicle exceeds a predefined volatile organic compound threshold. The volatile organic compound reduction control module can cause a blower of a Heating, Ventilation, and Cooling system of the vehicle to generate an airflow within the cabin for a predefined time period, cause an air distribution mode of operation to transition from a non-operational state to an operational state, can cause an air intake mode of operation to transition from a non-operational state to an operational state or cause at least one window of the vehicle to transition from a closed position to an open position for the predefined time period when the volatile organic compound characteristic exceeds the predefined volatile organic compound threshold to reduce volatile organic compounds within the vehicle.

A method according to the principles of the present disclosure includes determining whether a volatile organic compound (VOC) characteristic within a cabin of a vehicle exceeds a predefined volatile organic compound threshold. The method also includes causing a blower of a Heating, Ventilation, and Cooling (HVAC) system of the vehicle to generate an airflow within the cabin for a predefined time period, an air distribution mode of operation to transition from a non-operational state to an operational state, cause an air intake mode of operation to transitions from a non-operational state to an operational state, or causing at least one window of the vehicle to transition from a closed position to an open position for the predefined time period when the volatile organic compound characteristic exceeds the predefined volatile organic compound threshold to reduce volatile organic compounds within the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Volatile organic compounds, or VOCs, are organic chemical compounds that have a high vapor pressure at ordinary room temperature. Due to one or more manufacturing processes, interior components of the vehicle may emit VOCs.

The present disclosure is directed to a system that reduces VOCs within a vehicle, such as a new vehicle. In an example, the system described herein can selectively operate a blower of a heating, ventilation and air conditioning (HVAC) system of the vehicle based upon one or more input parameters. For instance, the system and method described herein can operate an HVAC module within the vehicle to modify the air intake mode and/or the air distribution mode of the HVAC module.

Figure 1:
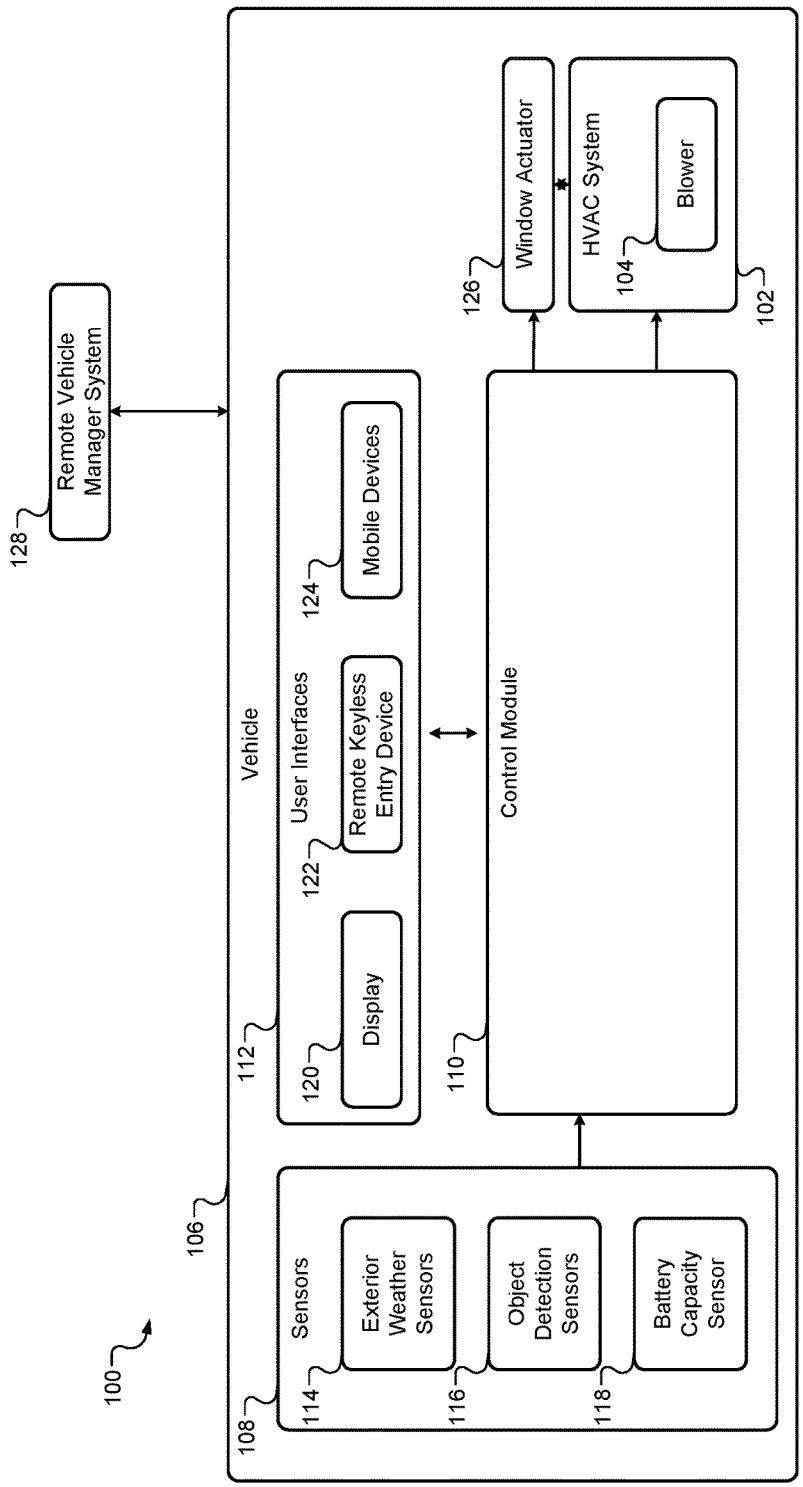
FIG. 1 is a functional block diagram of an example volatile organic compound (VOC) reduction system that includes a vehicle, vehicle systems, and a control module according to the principles of the present disclosure.

FIG. 1 shows a functional block diagram of an example of a volatile organic compound (VOC) reduction system 100 according to one or more implementations as described herein. The VOC reduction system 100 includes a heating, ventilation and air conditioning (HVAC) system 102 of a vehicle. The HVAC system 102 includes a blower 104 that generates an air stream directed into a cabin of the vehicle. In an implementation, the HVAC system 102 facilitates air transfer from an ambient environment external to the vehicle to the cabin through an air intake system. The air is transferred to the cabin through an air distribution system within the vehicle. In one example, the air distribution system includes one or more ducts for transferring the air through the vehicle. In one example, the HVAC system 102 controls operation of the blower 104 to operate the blower at various blower speeds. The blower 104 directs the air stream through one or more ducts within a vehicle 106. The HVAC system 102 can also include a VOC filter 105. The VOC filter 105 may be employed within the vehicle to remove VOCs from the ambient air obtained by the air intake system that is transferred to the cabin of the vehicle through the air distribution system.

The VOC reduction system 100 includes sensors 108, a control module 110, and user interfaces 112. As shown, the sensors 102 may include one or more sensors 114 for measuring external conditions (i.e., wind speed, ambient air temperature, air quality (PM2.5, NOx, Cox, bacteria, etc.), precipitation, such as rain, etc.) external to the vehicle 106. The sensors 102 may further include one or more object detection sensors 116 (i.e., cameras, light detection and ranging (LIDAR) devices, radio detection and ranging (RADAR) devices, etc.) for detecting objects proximal to the vehicle 106. The sensors 102 may further include a battery capacity sensor 118 for determining a battery capacity of a battery within the vehicle 106. In another example, the vehicle provides the battery capacity signal indicative of the battery capacity. For instance, one of more aspects of the VOC reduction operation may be at least partially powered (i.e., the blower 104, the window actuator(s) 126, HVAC mode actuator, outside air (OSA) vent actuator, etc.) by a battery within the vehicle 106.

The user interfaces 112 include a display 120, a remote keyless entry device 122, or one or more mobile devices 124. The remote keyless entry device 122 controls access to the vehicle 106. The mobile devices 124 include mobile phones, tablets, personal computers, wearable devices, etc. Each of the remote keyless entry devices 122 and/or the mobile devices 124 includes a processor, memory, and a transceiver. The memory of each of the remote keyless entry devices 122 and/or mobile devices store an application executable on the corresponding processor. The application, when executed, allows the remote keyless entry devices 122 and/or the mobile devices 124 to communicate with the control module 110. It is understood that the remote keyless entry devices 122 and/or the mobile devices 124 can communicate directly or indirectly with the control module 110. The transceivers of the remote keyless entry devices 122 and/or the mobile devices 124 may wirelessly communicate with the control module 110 and/or a transceiver included in or separate from and connected to the control module 110.

The VOC reduction system 100 also includes a window actuator 126 that can be operated by the control module 110 to control a respective window (i.e., a side window, a roof window, etc.) within the vehicle 106 as described herein. For instance, the control module 110 transmits a control signal to the window actuator 126 to cause the window actuator 126 to actuate a respective window from a closed position to an open position or vice versa. In an implementation, the open position can represent a window being actuated to a full open position corresponding to a fast mode of operation or being actuated to a partially open position corresponding to a safe mode of operation.

As shown, a remote vehicle manager system 128 is in communication with the vehicle. The remote vehicle manager system 128 allows a user to manage, maintain, and/or locate the vehicle 106. For instance, the remote vehicle manager system 128 is a third-party entity that can communicate with the vehicle, such as ONSTAR, a software application that can establish communication with the vehicle (i.e., control module 110), or the like. In implementations, the remote vehicle manager system 128 communicates with the control module 110 to initiate operation of a VOC reduction operation as described herein. The software application can be representative of any software application that can establish a communication (i.e., through a wireless or wired communication network) with the vehicle to control functionality of the vehicle.

Figure 2:
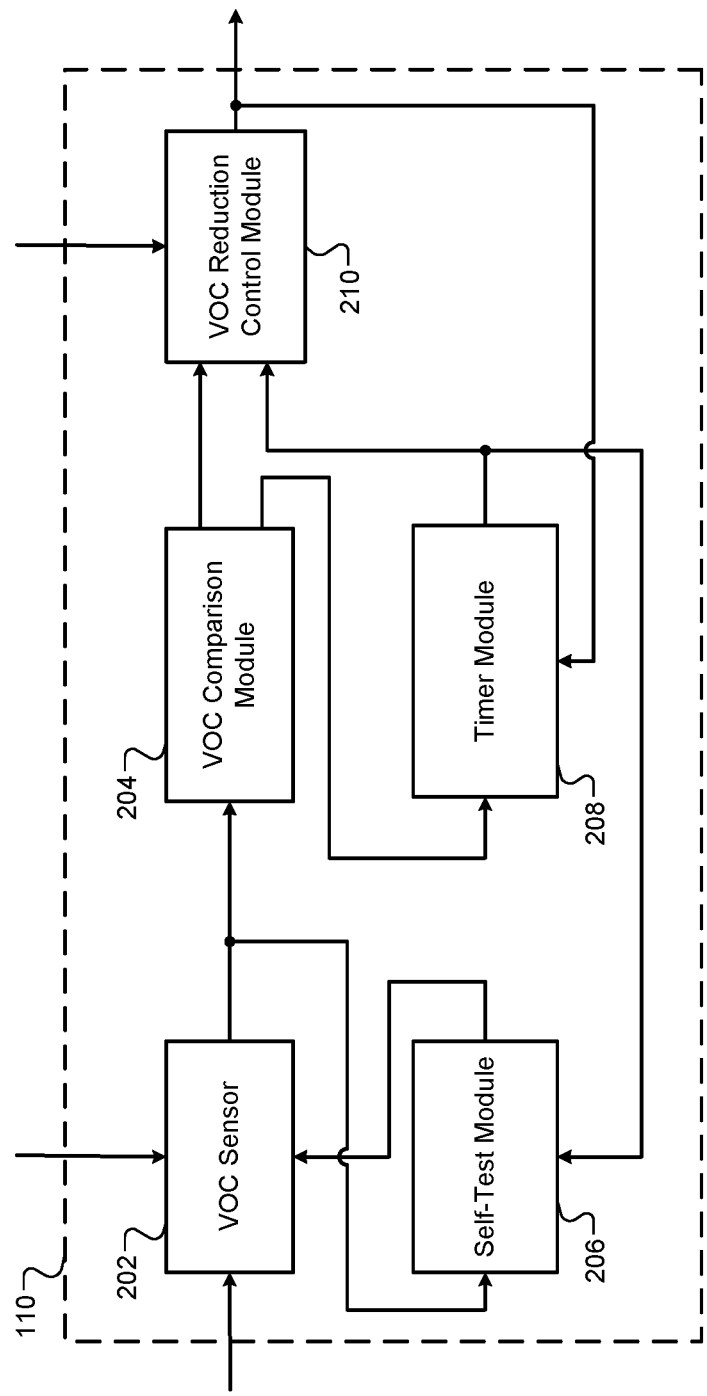
FIG. 2 is a functional block diagram of an control module according to the principles of the present disclosure.

FIG. 2 illustrates an example control module 110 to selectively control operational states of an HVAC system 102 and/or windows (via the window actuator(s) 126) of a vehicle 106 to reduce VOCs within the vehicle 106. As shown, the control module 110 includes a VOC sensor 202, a VOC comparison module 204, a self-test module 206, a timer module 208, and a VOC reduction control module 210.

The VOC sensor 202 detects a VOC concentration in the cabin air of a cabin of the vehicle 106 and generates a VOC concentration signal indicative of the VOC concentration (i.e., a value indicative of the VOC concentration) within the cabin air. In one example, the VOC sensor 202 includes a semiconductor resistor device. In another example, the VOC sensor 202 includes a photoionization detector. In yet another example, the VOC sensor 202 includes an optical fiber VOC sensor. In implementations, the VOC sensor 202 may be in a non-operational state when the VOC reduction system 100 is not operational to conserve energy within the VOC reduction system 100 and/or the vehicle.

The VOC comparison module 204 receives the VOC concentration signal as input and compares the VOC concentration value to a predefined VOC threshold value retained (i.e., stored) within the comparison module 204. The comparison module 204 generates a VOC comparison signal indicative of whether VOC concentration value exceeds the predefined VOC threshold or whether the VOC concentration value is equal to or less than the predefined VOC threshold value. The predefined VOC threshold value can be any value set by a vehicle manufacturer.

The self-test module 206 initiates a built-in test (BIT) to determine whether a build-up of compounds within the VOC sensor has occurred. The self-test module 206 receives the VOC concentration signal from the VOC sensor 202 to determine whether a compound characteristic exceeds a predefined compound threshold. For instance, the effectiveness of a VOC sensor 202 may diminish over time due to the build-up of compounds due to continued testing of a VOC concentration within the cabin air. The compounds may be oil films, dust particles, metal atoms, polymer-like coating compositions. During initialization of the VOC reduction system 100, the self-test module 206 determines whether an amount of compounds, based upon the value indicative of the VOC concentration, within the VOC sensor 202 exceeds a predefined compound threshold. The predefined compound threshold is indicative of a measurement value detected by the VOC sensor 202 upon start up or re-initialization of the VOC reduction system 100.

When the self-testing module 206 determines that the compound amount exceeds the predefined compound threshold, the self-testing module 206 initiates a self-cleaning process to remove compounds within the VOC sensor, as described herein.

Figure 3:
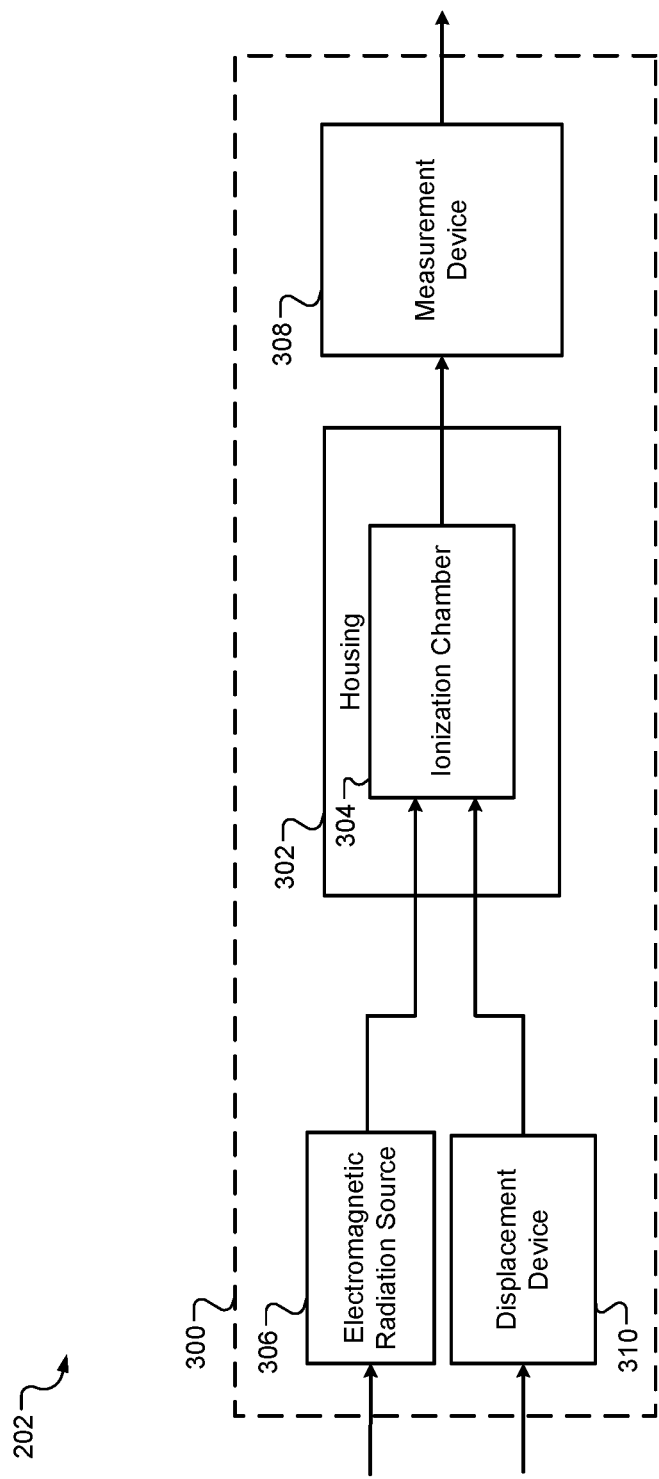
FIG. 3 is a functional block diagram of an example VOC Sensor according to the principles of the present disclosure.

FIG. 3 illustrates an example VOC sensor 202 in accordance with an example implementation of the present disclosure. In this implementation, the VOC sensor 202 comprises a photoionization detector 300. The photoionization detector 300 includes a housing 302 having an ionization chamber 304 disposed therein. The housing 302 (i.e., ionization chamber 304) receives gas, such as the cabin air, within the vehicle 106.

The photoionization detector 300 also includes an electromagnetic radiation source 306 that emits electromagnetic radiation occurring within a limited spectrum of wavelengths. In one example, the electromagnetic radiation source 306 generates ultraviolet (UV) electromagnetic radiation and/or UV photons having a wavelength characteristic ranging from ten nanometers (10 nm) to four hundred nanometers (400 nm). The electromagnetic radiation 302 ionizes volatile gas molecules (i.e., VOC) that are inside the ionization chamber 304.

The photoionization detector 300 also includes a measurement device 308. The measurement device 308 includes various electrodes that generate an electric field to attract positive ions that produce a measurement current resulting from the ionization of the gas molecules. The measurement device 308 measures the measurement current, which is a function of the compound concentration (i.e., compound amount) of VOCs within the cabin air. For instance, the measurement device 308 includes a biasing electrode and a measurement electrode. The biasing electrode and measurement electrode generates an electric field between the respective electrodes such that resulting electrons and ions can be collected to produce the measurement current that is a function of the compound concentration.

The photoionization detector 300 also includes a displacement device 310, such as a pump, that provides for the flow of gases into and out of the ionization chamber 304. When the displacement device 310 is in a non-operational state, the ionization chamber 304 is a closed volume to prevent gases from flowing into or out of the ionization chamber 304. When the displacement device 310 is in an operational state, the ionization chamber 304 is an open volume to allow gas (i.e., cabin air) to flow into or out of the ionization chamber 304. In an implementation, the flow of gas is perpendicular to the electrical field generated between the electrodes of the measurement device 308.

The self-testing module 206 can initiate a self-testing (i.e., the built-in test) operation and/or a self-cleaning operation of the VOC sensor 202. In this implementation, the self-testing module 206 selectively operates the photoionization detector 300 when the compound amount exceeds the predefined compound threshold. In one example, upon determination that the compound amount exceeds the predefined compound threshold, the self-testing module 206 causes the displacement device 310 to transition from an operational state to a non-operational state to prevent gases from entering or exiting the ionization chamber 304.

The electromagnetic radiation source 302 generates electromagnetic radiation that converts oxygen enclosed within the ionization chamber 304 to ozone for a predefined time period. The ozone can oxidize (i.e., removes, etches, etc.) compounds within the ionization chamber during this predefined time period. After the predefined time period, the displacement device 310, by way of the self-testing module 206, is transitioned from the non-operational state to the operational state to allow a gas flow within the ionization chamber 304 to discharge the compounds within the ionization chamber 304.

In implementations, the self-testing module 206 generates an alert signal to indicate the compound amount exceeds the predefined compound threshold. The user interface 112 receives the alert signal and causes display of a message indicative of the compound amount. The alert signal can also be transmitted to the keyless entry device 122 and/or the mobile devices 124 to alert the user to the compound amount. Additionally, in the event that a self-cleaning operation fails or the self-cleaning operation does not remove a sufficient amount of compounds, the alert signal can be indicative of the VOC sensor should be serviced.

Referring to FIG. 2, the control module 110 includes a timer module 208 that receives the VOC comparison signal as input and generates a timer signal. As shown, the timer signal is provided to the self-test module 206 and the VOC reduction control module 210 as input. The self-test module 206 utilizes the timer signal to initiate the self-cleaning operation. In an implementation, the timer signal represents a time period from the last self-cleaning operation. In another implementation, the timer signal represents a number of VOC detection events as represented by the VOC comparison signal. For instance, each time the timer module 208 receives a VOC comparison signal, the timer module 208 increments a counter indicating that a VOC detection event has occurred. Once the counter exceeds a predefined VOC comparison threshold, the timer module 208 generates the timer signal that is provided to the self-test module 206 to initiate the self-cleaning operation.

The VOC reduction control module 210 receives the VOC comparison signal from the comparison module 204 and the timer signal and generates a control signal based upon the VOC comparison signal and/or the timer signal. In various implementations, the control signal is an operational control signal to initiate operation of the VOC reduction operation or a termination control signal to terminate operation of the VOC reduction operation. The control signal is provided to the HVAC system 102 to control one or more operational states of the HVAC system 102. In one example, the control signal causes the HVAC system 102 to transition from a non-operational state to an operational state to cause the blower 104 to generate airflow through the cabin. Additionally, the control signal causes a window actuator 126 to actuate a window within the vehicle 106 from a closed, or non-open, position to an open position such that the cabin transitions from a closed volume to an open volume. The control signal can also cause an HVAC air intake mode of operation and/or air distribution (i.e., an HVAC air distribution) mode of operation to transition from a non-operational state to an operational state, or vice versa. For instance, the control signal can cause the HVAC air intake system to transition to a mode allowing the intake of air (or vice versa) as well as cause the air distribution system to transition to a mode (i.e., mode of operation) allowing the distribution of the air (or vice versa). Thus, the control signal causes the blower 104 to operate such that the blower 104 generates an airflow through the cabin and one or more windows of the vehicle 106 are opened to allow the at least a portion of the cabin air to exit the cabin to reduce the VOC concentration within the cabin. In this instance, the VOC reduction system 100 operates in a fresh mode of operation allowing outside forced airflow to push air from the interior of the vehicle through the window of the vehicle. The outside air may be filtered through a suitable filter to at least partially remove any VOCs from the outside air.

The control signal selectively operates, or adjusts, an operating state of the blower 104 in some implementations. In one example, the control signal causes the blower 104 to operate at a speed based upon the VOC concentration. For instance, the VOC comparison signal can include how much the VOC concentration exceeds the predefined VOC threshold value. Thus, the blower 104 is operated at a speed that is a function of how much the VOC concentration exceeds the predefined VOC threshold value. In one instance, the blower 104 is operated at a first speed when the VOC concentration exceeds the predefined VOC threshold value by a first defined value. In another instance, the blower 104 is operated at a second speed when the VOC concentration exceeds the predefined VOC threshold value by a second defined value, and so forth. In some implementations, the blower 104 is operated at a single speed that is independent of the VOC concentration.

The VOC reduction control module 210 can terminate the VOC reduction operation by generating a termination control signal that causes the HVAC system 102 to transition from an operational state to a non-operational state. In some implementations, the VOC reduction control module 210 can transition the air intake system of the vehicle to a mode that prevents the intake of ambient air and/or can transition the air distribution system to a mode that prevents or inhibits the distribution of air (i.e., closing vents, etc.). Additionally, the termination control signal can cause the windows, via the window actuator(s) 126, to transition from an open position to a closed position to enclose the vehicle 106. In an implementation, the VOC reduction control module 210 generates the operational control signal and/or the termination control signal based upon the timer signal. For instance, the timer signal can represent a time between respective VOC reduction operations. Thus, in this instance, the VOC reduction control module 210 utilizes the timer signal to determine that a VOC reduction operation has not occurred within a certain time period and generates the operational control signal based upon the time elapsed since the previous VOC reduction operation. In some examples, the termination control signal can be a new comparison result generated by the VOC comparison module 204.

In another instance, the timer signal can represent a time period representing the time since the current VOC reduction operation was initiated. Thus, after a predefined amount of time (i.e., predefined time period) has elapsed, the VOC reduction control module 210 generates a termination control signal to cease operation of the HVAC system 102 and/or to cause the window actuator(s) 126 to transition respective window(s) from the open position to the closed position.

The VOC reduction control module 210 also receives one or more environmental characteristic signals from the sensors 108. In one example, the sensors 108 generate and transmit the environmental characteristic signals to the VOC reduction control module 210. The environmental characteristic signals represent measurements pertaining to an environmental characteristic. For instance, the environmental characteristic signals can represent a precipitation characteristic (i.e., indicating whether the environment is producing rain, etc.), a wind characteristic (i.e., indicating a wind speed of the surrounding environment), an external pollution concentration characteristic (i.e., an indication of the concentration of external pollution of the surrounding environment), an object proximity characteristic (i.e., indicating whether an object, such as a person, has been detected proximate to the vehicle 106 for safety or security purposes), a battery capacity (i.e., state-of-charge value associated with the vehicle 106) characteristic, and so forth. As described herein, the VOC reduction control module 210 can initiate the VOC reduction operation in a fast mode (i.e., expedited removal of VOCs within the cabin) or a safety mode (i.e., removal of the VOCs over a longer time period to account for environmental characteristics).

Based upon the environmental characteristic signal, the VOC reduction control module 210 can prevent initiation of the HVAC system 102 and/or transitioning of the window(s) from a closed position to an opened position (i.e., a fully opened position, a partially opened position). In one example, the VOC reduction control module 210 can prevent initiation of the HVAC system 102 and/or transitioning of the window(s) from a closed position to a opened position when an environmental characteristic signal exceeds an environmental threshold value. For instance, if the external pollutant concentration exceeds a pollutant concentration threshold, the VOC reduction control module 210 prevents the vehicle from initiating the VOC reduction operation. In another instance, if an object is detected proximate to the vehicle, the VOC reduction control module 210 prevents the vehicle from initiating the VOC reduction operation for security purposes. The VOC reduction control module 210, in some instances, can also initiate a recycle mode of operation to recirculate air within the vehicle when the environmental characteristic signal exceeds the environmental threshold value. In some instances, a user can utilize a remote keyless entry device 122 to initiate operation of the VOC reduction operation. In these instances, prior to the user entering the vehicle, the user can utilize the remote keyless entry device 122 to cease operation of the VOC reduction operation. In one example, upon receiving the control signal from the remote keyless entry device 122 to cease operation, the VOC reduction control module 210 can initiate the recycle mode of operation.

The VOC reduction control module 210 can also receive a VOC reduction initiation signal transmitted through a communication network (i.e., a wired communication network or a wireless network). For example, the VOC reduction control module 210 can receive a VOC reduction initiation signal (i.e., operational command) generated by a remote keyless entry device 122, a mobile device 124, and/or a remote vehicle manager system 128. Thus, a user or an entity authorized by the user can initiate a VOC reduction initiation signal that is transmitted to the VOC reduction system 100 through the communication network.

In implementations, the VOC reduction initiation signal overrides current VOC reduction operations. For instance, the VOC reduction initiation signal can include blower speed to cause the blower 104 to blow at the blower speed and/or window lowering parameters to cause the window actuator to lower the windows to a defined window position (i.e., the window is lowered to a one-third position with respect to a full-open position for safety or environmental purposes).

Figure 4:
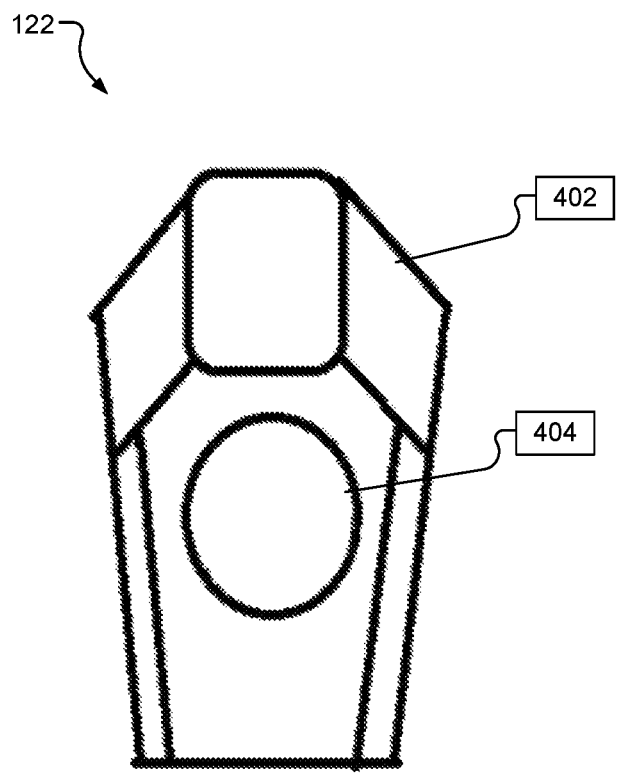
FIG. 4 is diagrammatic illustration of an example remote keyless entry device that interfaces with the VOC reduction system according to the principles of the present disclosure.

FIG. 4 illustrates an example remote keyless entry device 122. As shown, the keyless entry device 122 includes one or more user interfaces 402 that can be actuated by a user to initiate one or more operational states (i.e., a lock operation, an unlock operation, VOC reduction initiation signal, etc.) associated with the vehicle 106. The keyless remote entry device 122 generates and transmits an operational signal corresponding to the user interface 402 actuated by a user. In some implementations, the remote keyless entry device 122 also includes a display 404. In one example, the display 404 is a touch sensitive display that displays information pertaining to the vehicle 106 and provides a user interface to receive one or more operational commands from the user. Additionally, the display 404 can display a VOC concentration measured within the cabin via the VOC sensor 202.

Figure 5:
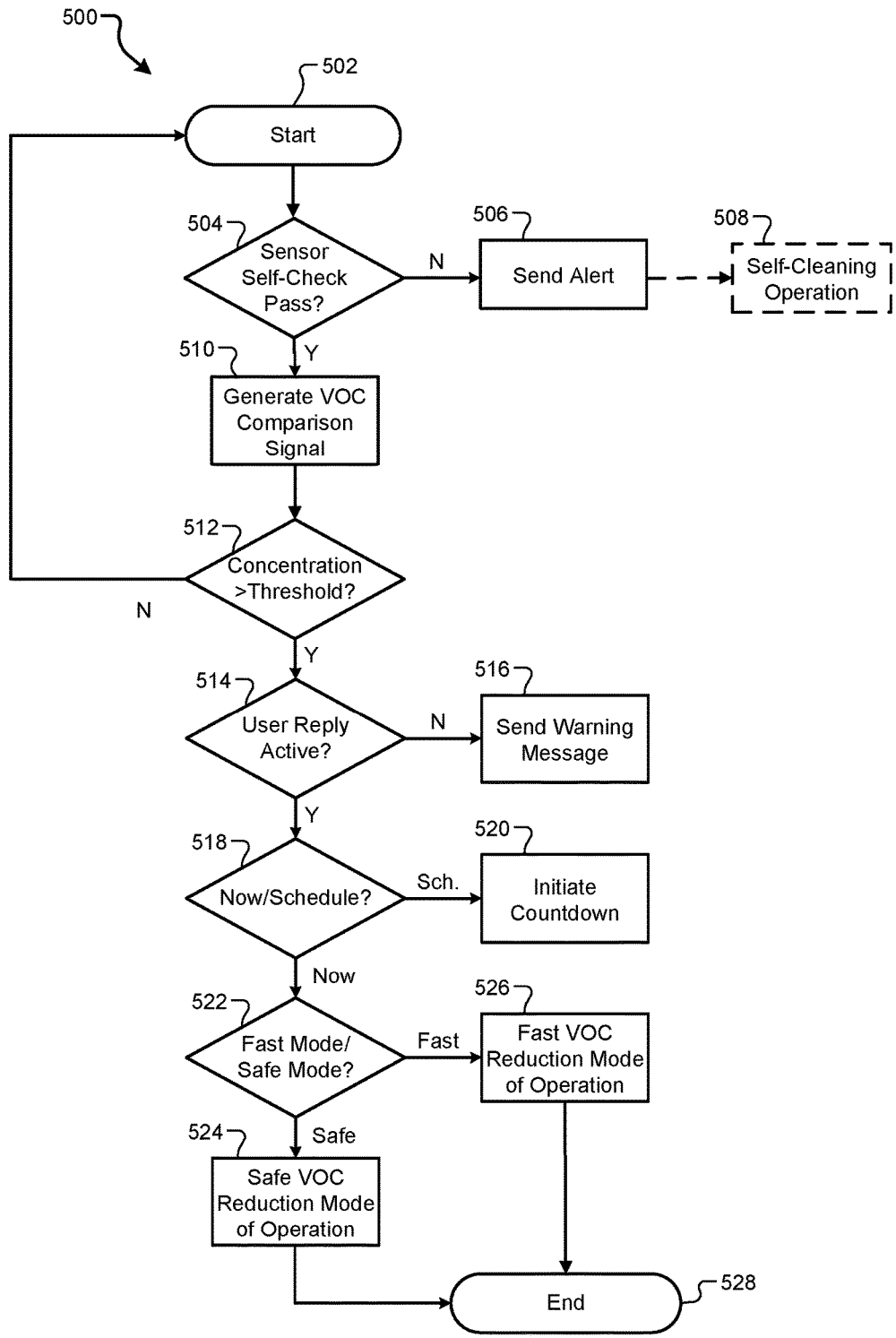
FIG. 5 is a flowchart illustrating an example method for determining whether to initiate a VOC reduction system according to the principles of the present disclosure.

FIG. 5 illustrates an example method 500 for reducing VOCs within a vehicle. The method 500 begins at 502. At 504, the self-testing module 206 conducts a self-test (i.e., a built-in test (BIT)) of the VOC sensor 202 to determine whether compound amount within the VOC sensor 202 exceeds a predefined compound threshold. If the compound amount exceeds the predefined compound threshold, the self-testing module 206 generates an alert signal at 506. Additionally or alternatively, if the compound amount exceeds the predefined compound threshold, the self-testing module 206 initiates a self-cleaning operation at 508. In some instances, a service message indicative that the VOC sensor 202 should be serviced is generated once the self-testing protocol has been initiated greater than or equal to a self-testing protocol threshold.

If the compound amount does not exceed the predefined compound threshold, the VOC comparison module 204 generates a VOC comparison signal representing the VOC concentration signal and provides the comparison signal to VOC reduction control module 210 at 510. The VOC reduction control module 210 compares the VOC concentration value to a predefined VOC threshold value at 512. If the VOC concentration value does not exceed the predefined VOC threshold value, the method 500 transitions to 502 to for continued monitoring of the VOCs within the vehicle 106.

If the VOC concentration value does exceed the predefined VOC threshold value, the VOC reduction control module 210 causes transmission of a message to a user and a determination is made of whether a user reply is active at 514. For instance, the VOC reduction control module 210 transmits a message to a user indicative of the VOC concentration within the cabin. The VOC reduction control module 210 transmits the message to a user interface 112 associated with the user. The user may utilize the remote keyless entry device 122 and/or the mobile device 124 to initiate the VOC reduction operation as discussed herein. If a user reply is not active, the VOC reduction control module 210 transmits a warning message indicative of the VOC concentration to the mobile device 124 at 516. The VOC reduction control module 210 may periodically transmit warning messages at predefined time intervals until a user reply is received. If a number of warning messages exceeds a predefined warning threshold, the VOC reduction control module 210 transmits a final warning message indicative of the VOC concentration and indicating that a VOC reduction operation should be initiated.

If a user reply has been received, the VOC reduction control module 210 determines whether a VOC reduction operation is to be initiated at a current time or whether the VOC reduction operation is scheduled to be initiated at a future time at 518. If the VOC reduction operation is schedule for a future time, the VOC reduction control module 210 transmits a signal indicative of the future time to the timer module 208 to cause the timer module 208 to initiate a countdown to the future time at 520 so that the VOC reduction operation is initiated once the countdown has elapsed.

When the VOC reduction operation is initiated, the VOC reduction control module 210 determines whether to initiate the VOC reduction operation in a fast VOC reduction mode of operation or a safe VOC reduction mode of operation at 522. The VOC reduction control module 210 determines a mode of operation based upon the environmental characteristics received at the VOC reduction control module 210. At 526, the fast VOC reduction mode of operation may be defined as causing the blower 104 to operate at a predefined speed and to cause the window actuator 126 to transition the window to a fully open position for a predefined fast mode amount of time (i.e., fifteen seconds (15 sec.), one minute (1 min.), etc.). At 524, the safe VOC reduction mode of operation may comprise causing the blower 104 to operate at a predefined speed and to cause the window actuator 126 to transition the window to a fully open position for a predefined safe mode amount of time (i.e., fifteen minutes (15 min.), twenty minutes (20 min.), etc.). Based upon the determination, the VOC reduction control module 210 generates the operational control signal to initiate the VOC reduction operation at 524. In one example, the VOC reduction control module 210 initiates operation of the VOC reduction operation within a new vehicle prior to an end user purchasing the vehicle 106. As described below, the vehicle age can be utilized to determine whether the vehicle is a new vehicle. The method 500 ends at 528.

Figure 6:
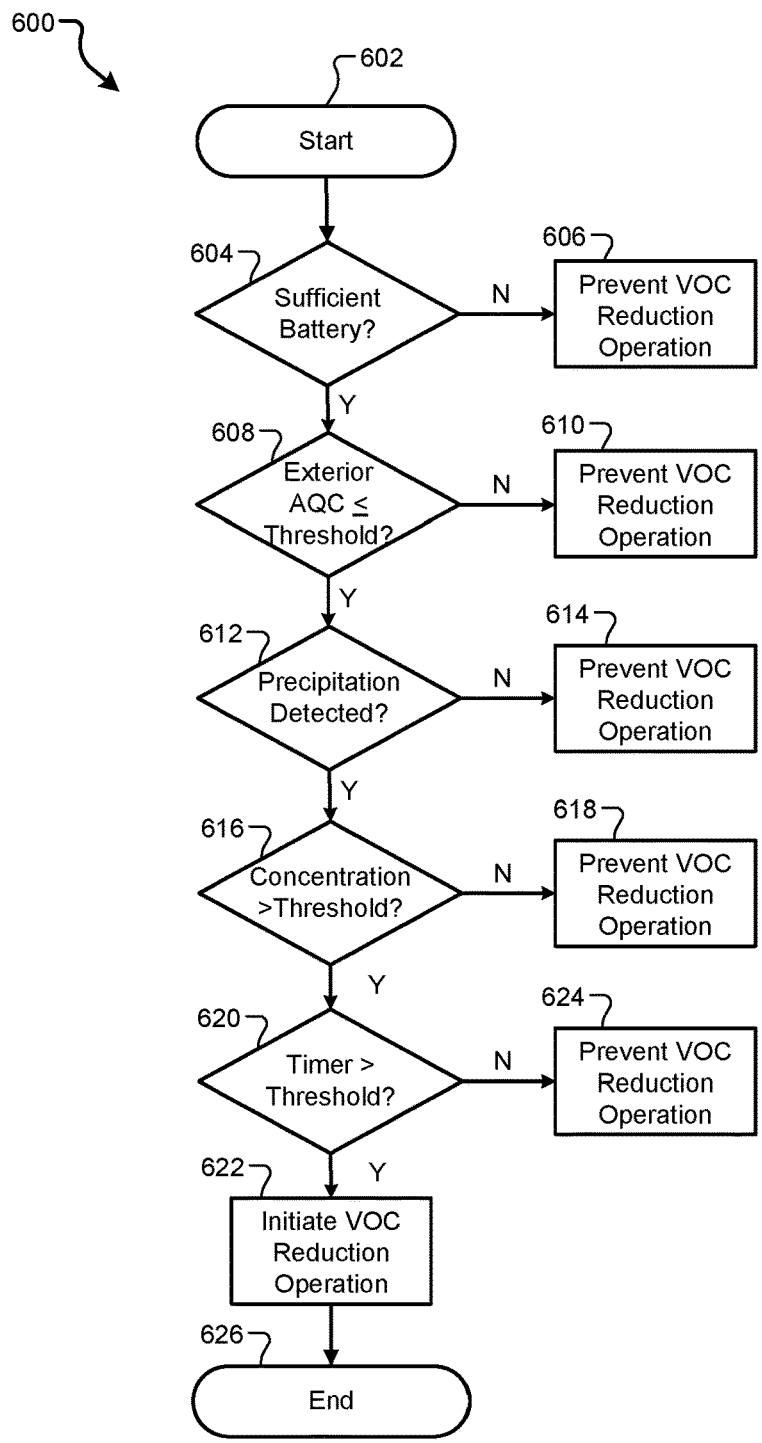
FIG. 6 is another flowchart illustrating an example method for determining whether to initiate the VOC reduction system according to the principles of the present disclosure.

FIG. 6 illustrates a method 600 for determining a VOC reduction operational state based upon environmental characteristics. The method 600 begins at 602. At 604, the VOC reduction control module 210 determines whether there is sufficient battery capacity to complete a VOC reduction operation. If there is insufficient battery capacity, the VOC reduction control module 210 prevents initiation of the VOC reduction operation at 606. If there is sufficient battery capacity, the VOC reduction control module 210 determines whether an external air quality concentration (AQC) exceeds a predefined external air quality threshold at 608.

If the external air quality concentration exceeds the predefined external air quality threshold, the VOC reduction control module 210 prevents initiation of the VOC reduction operation from initiating at 610. The VOC reduction control module 210 can also generate an alert message (i.e., service message) indicating the external air quality concentration exceeds the predefined external air quality threshold. If the external air quality concentration does not exceed the predefined external air quality threshold, the VOC reduction control module 210 determines whether an external environment includes precipitation (i.e., snow, rain, etc.) at 612. If there is precipitation detected, the VOC reduction control module 210 prevents initiation of the VOC reduction operation from initiating at 614.

If no precipitation is detected, the VOC reduction control module 210 determines whether the VOC concentration value exceeds the predefined VOC threshold value at 616. If the VOC concentration value does not exceed the predefined VOC threshold value, the VOC reduction control module 210 prevents initiation of the VOC reduction operation at 618. If the VOC concentration value exceeds the predefined VOC threshold value, the VOC reduction control module 210 determines whether a timer value, as generated by the timer module 208, is greater than a predefined timer threshold at 620. If the timer value exceeds the timer threshold, the VOC reduction control module 210 generates the operational control signal to initiate the VOC reduction operation of the HVAC system 102 at 622. If the timer value exceeds the timer threshold, the VOC reduction control module 210 prevents initiation of the VOC reduction operation from initiating at 624.

At 606, 610, 614, 618, and 624, the VOC reduction control module 210 generates a message that is transmitted to a user or an entity to indicate that the VOC reduction operation is not currently operational for the respective reason. The VOC reduction control module 210 transmits the generated message to a user interface 112 and/or the remote vehicle manager system 128. The method 600 ends at 626.

Figure 7:
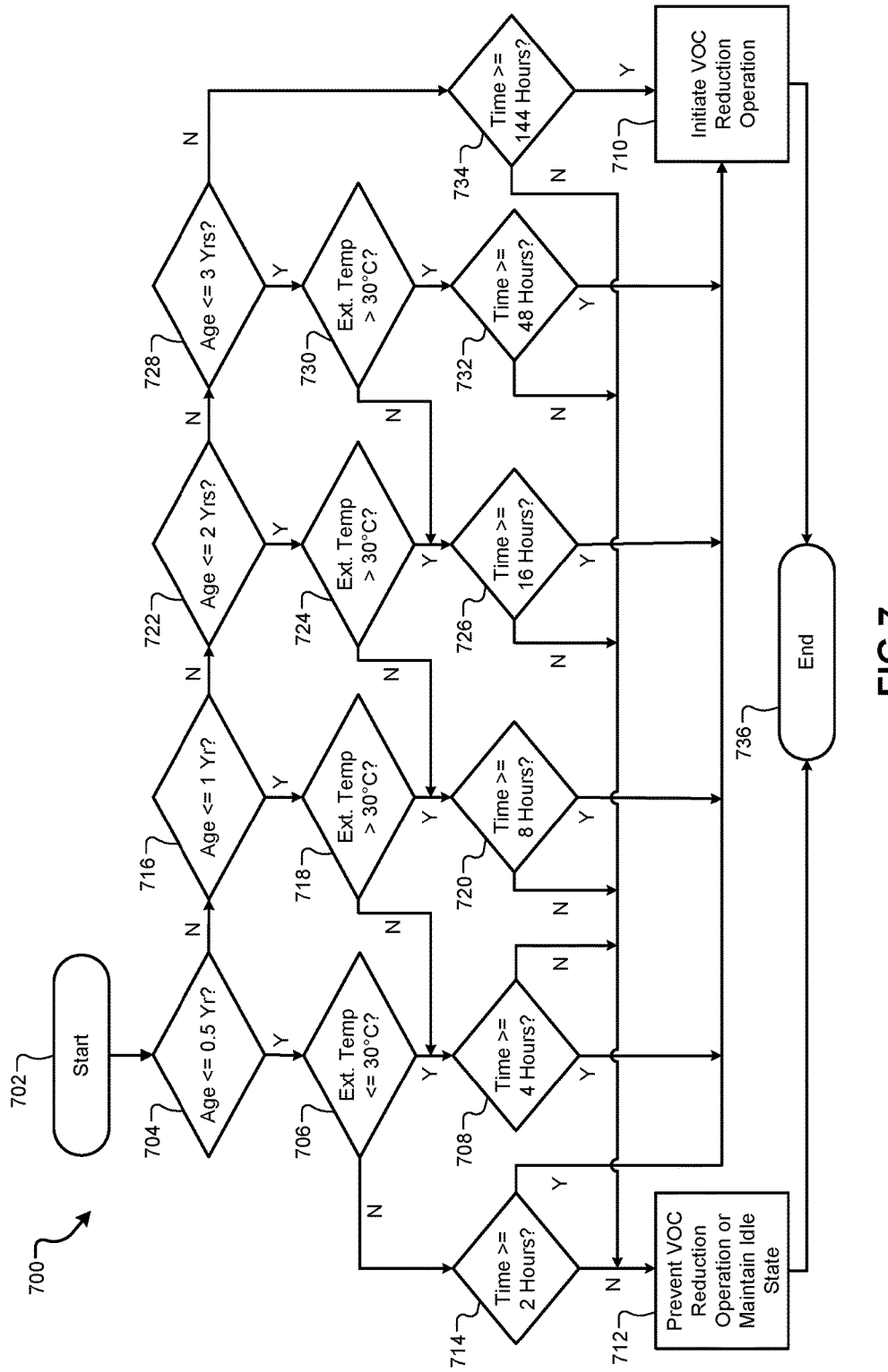
FIG. 7 is another flowchart illustrating an example method for determining whether to initiate the VOC reduction system according to the principles of the present disclosure.

FIG. 7 illustrates an example method 700 for initiating a VOC reduction operation. For instance, the VOC reduction operation can be initiated through the user interfaces 112 and/or the remote vehicle manager system 128 that is in communication with the vehicle 106 based upon external environmental characteristics. The below described parameters relating to vehicle age, time period elapsed, and external temperature are included for ease of understanding the method 700. Thus, it is understood that any suitable parameters may be utilized in place of the parameters described herein.

The method 700 begins at 702. At 704, the VOC reduction control module 210 determines whether a vehicle age is less than or equal to a half of a year. If the vehicle age is less than or equal to a half of a year, the VOC reduction control module 210 determines whether the external temperature is less than or equal to thirty degrees Celsius at 706. If the external temperature is less than or equal to thirty degrees Celsius, the VOC reduction control module 210 determines whether a time period has elapsed since the previous VOC reduction operation is greater than or equal to four hours at 708. If the time period is greater than or equal to four hours, the VOC reduction control module 210 generates an operational control signal that initiates operation of the VOC sensor 202 to determine a status of the VOC concentration within the vehicle cabin at 710. If the time period is less than four hours, the VOC reduction system remains in an idle state or non-operational state at 712.

If the external temperature is greater than thirty degrees Celsius, the VOC reduction control module 210 determines whether a time period has elapsed since the previous VOC reduction operation is greater than or equal to two hours at 714. If the elapsed time period is greater than or equal to two hours, the VOC reduction control module 210 generates an operational control signal that initiates operation of the VOC sensor 202 to determine a status of the VOC concentration within the vehicle cabin at 710 If the elapsed time period is less than two hours, the VOC reduction control module 210 the VOC reduction system remains in an idle state or non-operational state at 712.

If the vehicle age is greater than a half of a year, the VOC reduction control module 210 determines whether a vehicle age is less than or equal to one year at 716. If the vehicle age is less than or equal to a one year, the VOC reduction control module 210 determines whether the external temperature is greater than thirty degrees Celsius at 718. If the external temperature is less than or equal to thirty degrees Celsius, the method transitions to 708. If the external temperature is greater than thirty degrees Celsius, the VOC reduction control module 210 determines whether the elapsed time period is greater than or equal to eight hours at 720. If the elapsed time period is greater than eight hours, the method transitions to 710.

If the vehicle age is greater than one year, the VOC reduction control module 210 determines whether a vehicle age is less than or equal to two years at 722. If the vehicle age is less than or equal to two years, the VOC reduction control module 210 determines whether the external temperature is greater than thirty degrees Celsius at 724. If the external temperature is less than or equal to thirty degrees Celsius, the method transitions to 720. If the external temperature is greater than thirty degrees Celsius, the VOC reduction control module 210 determines whether the elapsed time period is greater than or equal to sixteen hours at 726. If the elapsed time period is greater than sixteen hours, the method transitions to 710.

If the vehicle age is greater than two years, the VOC reduction control module 210 determines whether a vehicle age is less than or equal to three years at 728. If the vehicle age is less than or equal to three years, the VOC reduction control module 210 determines whether the external temperature is greater than thirty degrees Celsius at 730. If the external temperature is less than or equal to thirty degrees Celsius, the method transitions to 726. If the external temperature is greater than thirty degrees Celsius, the VOC reduction control module 210 determines whether the elapsed time period is greater than or equal to forty-eight hours at 732. If the elapsed time period is greater than forty-eight hours, the method transitions to 710.

If the vehicle age is greater than three years, the VOC reduction control module 210 determines whether the elapsed time period is greater than or equal to one hundred and forty-four hours at 734. If the elapsed time period is greater than one hundred and forty-four hours, the method transitions to 710. The method ends at 736. The vehicle age may be retained in any one of the modules described herein. Additionally, VOC reduction operations can be a function of the vehicle age (i.e., the vehicle age does not exceed a vehicle age threshold) and/or an external air temperature. Thus, VOC reduction operations, prior to the vehicle being sold to an end user, can be employed at a greater frequency to reduce the VOC concentration within the vehicle, such as vehicle 106. In implementations, the VOC reduction operations can be modified based upon a number of factors as desired by the manufacturer and/or the owner.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a volatile organic compound comparison module that is configured to determine whether a volatile organic compound concentration within a cabin of a vehicle exceeds a predefined volatile organic compound threshold; and
   a volatile organic compound reduction control module that is configured to at least one of cause a blower of a Heating, Ventilation, and Cooling system of the vehicle to generate an airflow within the cabin for a predefined time period, cause an air distribution mode of operation to transition from a non-operational state to an operational state, cause an air intake mode of operation to transition from a non-operational state to an operational state, and cause at least one window of the vehicle to transition from a closed position to an open position for the predefined time period when the volatile organic compound concentration exceeds the predefined volatile organic compound threshold to reduce volatile organic compounds within the vehicle,
   wherein the volatile organic compound reduction control module is further configured to cause the blower to generate the airflow within the cabin for the predefined time period and to cause the at least one window of the vehicle to transition from the closed position to the open position for the predefined time period when the volatile organic compound concentration exceeds the predefined volatile organic compound threshold and when a vehicle age of the vehicle is below a vehicle age threshold.

2. The system of claim 1, further comprising a volatile organic compound sensor that is configured to measure the volatile organic compound concentration within the cabin of the vehicle.

3. The system of claim 2, wherein the volatile organic compound sensor comprises at least one of a semiconductor resistor device, a photoionization detector, and an optical fiber volatile organic compound sensor.

4. The system of claim 2, further comprising a self-test module that is configured to initiate a built-in test to determine whether a compound concentration exceeds a predefined compound threshold.

5. The system of claim 4, wherein the self-test module initiates a self-cleaning operation for the volatile organic compound sensor when the compound concentration exceeds the predefined compound threshold and generates an alert when the self-cleaning operation fails, wherein the self-cleaning operation comprises causing a displacement device within a photoionization detector to transition from an operation state to a non-operational state.

6. The system of claim 1, further comprising a timer module that is configured to generate a timer signal that is provided to the volatile organic compound reduction control module when the predefined time period has elapsed such that the volatile organic compound reduction control module is configured to generate a termination control signal to cause the blower to transition from an operational state to a non-operational state and to cause the at least one window to transition from the open position to the closed position.

7. The system of claim 1, wherein the volatile organic compound reduction control module is further configured to adjust a speed of the blower and to adjust the open position of the at least one window based upon an environmental pollutant concentration indicative of an environment external to the vehicle.

8. The system of claim 1, wherein the volatile organic compound reduction control module is further configured to generate an alert message when an external air quality concentration exceeds a predefined external air quality threshold, wherein the alert message is displayed at a user interface.

9. The system of claim 1, wherein the volatile organic compound reduction control module is further configured to cause the blower to generate the airflow within the cabin for the predefined time period and to cause at least one window of the vehicle to transition from a closed position to an open position for the predefined time period when a volatile organic compound reduction initiation signal is received from a remote vehicle manager system.

10. A method comprising:
    determining whether a volatile organic compound (VOC) concentration within a cabin of a vehicle exceeds a predefined volatile organic compound threshold;
    causing at least one of a blower of a Heating, Ventilation, and Cooling (HVAC) system of the vehicle to generate an airflow within the cabin for a predefined time period, an air distribution mode of operation to transition from a non-operational state to an operational state, an air intake mode of operation to transitions from a non-operational state to an operational state, and at least one window of the vehicle to transition from a closed position to an open position for the predefined time period when the volatile organic compound concentration exceeds the predefined volatile organic compound threshold to reduce volatile organic compounds within the vehicle; and
    causing the blower to generate the airflow within the cabin for the predefined time period and causing the at least one window of the vehicle to transition from the closed position to the open position for the predefined time period when the volatile organic compound concentration exceeds the predefined volatile organic compound threshold and when a vehicle age of the vehicle is below a vehicle age threshold.

11. The method of claim 10, further comprising measuring the volatile organic compound concentration within the cabin of the vehicle via a volatile organic compound sensor.

12. The method of claim 11, wherein the volatile organic compound sensor comprises at least one of a semiconductor resistor device, a photoionization detector, and an optical fiber volatile organic compound sensor.

13. The method of claim 11, further comprising initiating a built-in test to determine whether a compound concentration exceeds a predefined compound threshold.

14. The method of claim 13, further comprising initiating a self-cleaning operation for the volatile organic compound sensor when the compound concentration exceeds the predefined compound threshold; and generating an alert when the self-cleaning operation fails, wherein the self-cleaning operation comprises causing a displacement device within a photoionization detector to transition from an operation state to a non-operational state.

15. The method of claim 10, further comprising measuring the predefined time period upon receiving a volatile organic compound comparison signal indicating that the volatile organic compound concentration exceeds the predefined volatile organic compound threshold and generating a timer signal to cause the blower to transition from an operational state to a non-operational state and to cause the at least one window to transition from the open position to the closed position.

16. The method of claim 10, further comprising adjusting a speed of the blower based upon an environmental pollutant concentration indicative of an environment external to the vehicle; and adjusting an open position of the at least one window based upon the environmental pollutant concentration.

17. The method of claim 10, further comprising generating an alert message when an external air quality concentration exceeds a predefined external air quality threshold; and causing the alert message to be displayed at a user interface.

18. The method of claim 10, further comprising causing the blower to generate the airflow within the cabin for the predefined time period and causing at least one window of the vehicle to transition from a closed position to an open position for the predefined time period when a volatile organic compound reduction initiation signal is received from a remote vehicle manager system.

* * * * *